(12) United States Patent
Stratton et al.

(10) Patent No.: US 6,253,136 B1
(45) Date of Patent: Jun. 26, 2001

(54) METHOD AND APPARATUS FOR A LIMP HOME MODE

(75) Inventors: Kenneth L. Stratton, Dunlap; Brian G. Funke, Peoria; Steven R. Genseal; Steven R. Kruase, both of Chillicothe; Richard J. Skiba, Peoria, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/282,382

(22) Filed: Mar. 31, 1999

(51) Int. Cl.$^7$ ............... G06F 17/00; G06F 7/00; G06F 19/00
(52) U.S. Cl. ............... 701/50; 701/62; 701/63; 172/3; 172/4; 172/7; 172/9; 172/86; 172/87; 172/88; 172/89; 172/820; 144/4.1; 144/34.1; 414/729
(58) Field of Search ............... 701/50, 62, 63; 172/4, 3, 7, 9, 86–89, 820; 144/4.1, 34.1; 414/729

(56) References Cited

U.S. PATENT DOCUMENTS

| | | | |
|---|---|---|---|
| 5,421,416 | * | 6/1995 | Orbach et al. ............... 172/4 |
| 5,469,921 | * | 11/1995 | Orbach et al. ............... 172/4 |
| 5,472,056 | * | 12/1995 | Orbach ............... 172/2 |
| 5,549,166 | * | 8/1996 | Orbach et al. ............... 172/4 |
| 5,790,969 | | 8/1998 | McKee ............... 701/51 |
| 5,829,397 | | 11/1998 | Vorih et al. ............... 123/90.12 |
| 5,875,409 | | 2/1999 | Steeby et al. ............... 701/52 |
| 5,896,297 | * | 4/1999 | Valerino, Sr. ............... 364/478.01 |
| 6,109,363 | * | 8/2000 | High ............... 172/820 |
| 6,120,237 | * | 9/2000 | Cummings et al. ............... 414/729 |
| 6,123,124 | * | 9/2000 | Naud ............... 144/4.1 |

* cited by examiner

Primary Examiner—William A. Cuchlinski, Jr.
Assistant Examiner—Ronnie Mancho
(74) Attorney, Agent, or Firm—W. Bryan McPherson, III

(57) ABSTRACT

The present invention provides a method and apparatus for controlling a work implement in order to enable an earth moving machine to move to a service area after a failure within an implement control system occurs. The method includes the steps of detecting the failure of the implement control system, enabling a limp home mode in response to the failure, and controlling the implement into a limp home position through operator interaction using a display and either an associated keypad or a touch screen.

23 Claims, 4 Drawing Sheets

Fig-3a-
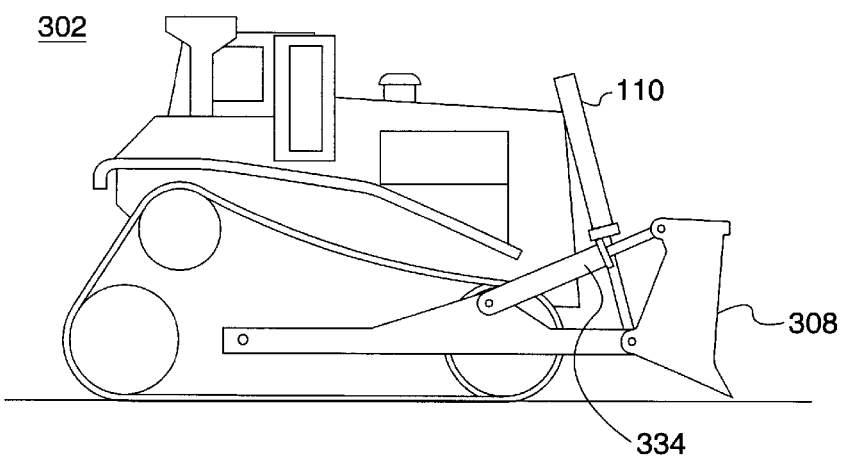
Fig-3b-
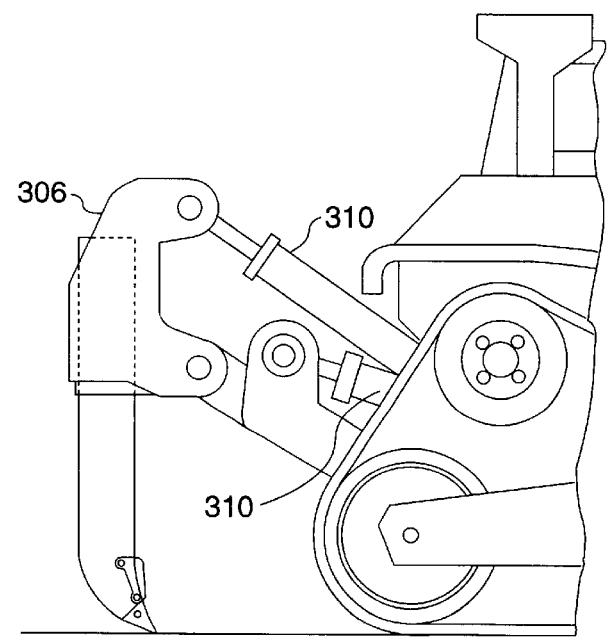

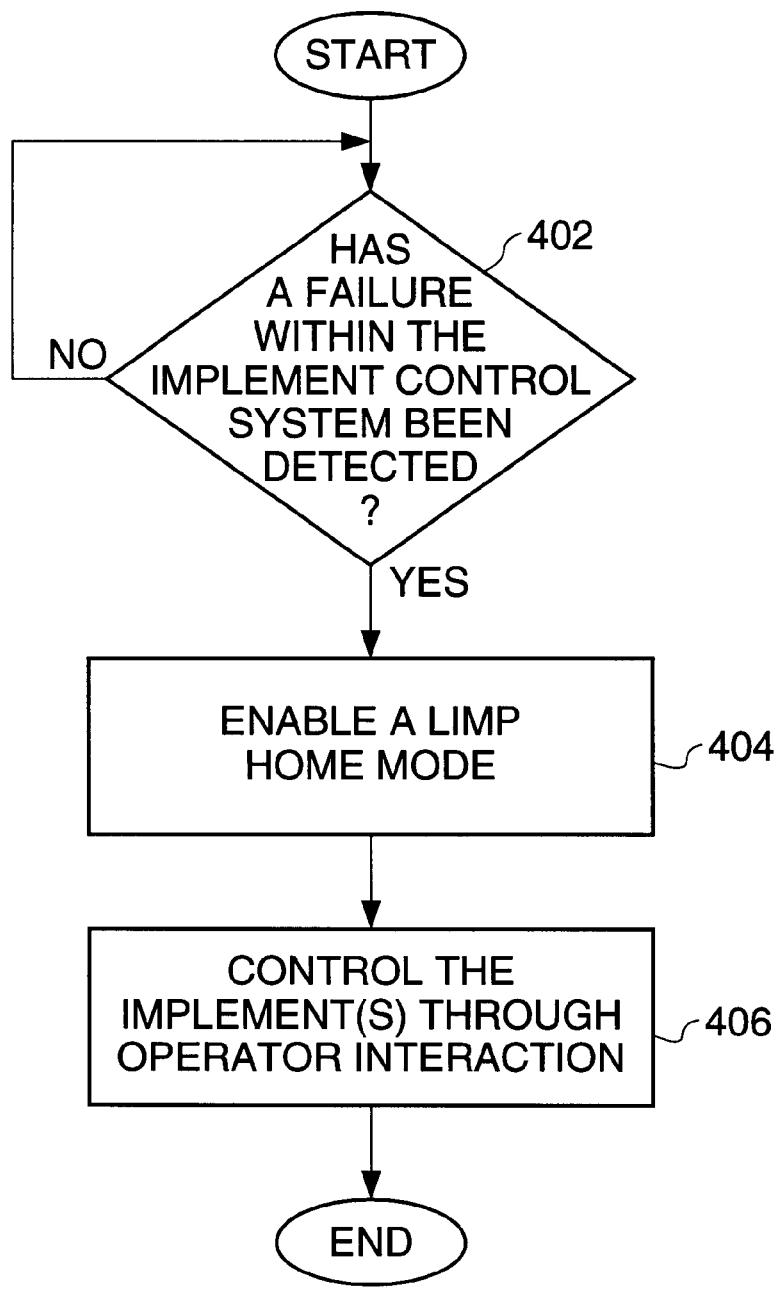

METHOD AND APPARATUS FOR A LIMP HOME MODE

TECHNICAL FIELD

This invention relates generally to a method of implement control, and more particularly, to a method and apparatus for controlling an implement of an earthmoving machine after a failure has occurred.

BACKGROUND ART

The work implements of an earth moving machine, such as a track type tractor, are controlled by an implement control system. In one embodiment, an implement control system includes a hydraulic circuit necessary to control a work implement, and an operator interface, such as joysticks, displays and keypads, to enable an operator to control the work implement via the hydraulic circuit. There are conditions where failures that occur within the implement control system may disable implement motion. For example, a faulty joystick used to control blade position would prevent the operator from raising or lowering the blade. The site of operation of earthmoving machines is generally too rugged and inaccessible for mobile repair vehicles. When a failure does occur that disables normal operator implement controls the tractor may be left in a position where it is unable to move, and therefore unable to return to an area to be serviced.

The present invention is directed to overcoming one or more of the problems identified above.

DISCLOSURE OF THE INVENTION

In one aspect of the present invention, a method for controlling a work implement, after a failure within an implement control system has occurred, is disclosed. The method includes the steps of detecting the failure of the implement control system, enabling a limp home mode in response to the failure, and controlling the implement into a limp home position.

In another aspect of the present invention, an apparatus adapted to control a work implement after a failure within an implement control system has occurred is disclosed. The apparatus includes a means for detecting a failure within an implement control system and responsively generating a failure signal, an operator interface adapted to receive operator inputs and responsively generate operator input signals, and receive and display an operator message, and a controller adapted to receive the failure signal, and the operator input signal, and enable a limp home mode in response to the failure signal.

BRIEF DESCRIPTION OF THE DRAWINGS

FIG. 3A is an illustration of an earth moving machine having a blade;

FIG. 3B is an illustration of an earth moving machine having a ripper attachment; and FIG. 4 is an illustration of the method for controlling a work implement after a failure has occurred.

BEST MODE FOR CARRYING OUT THE INVENTION

Figure 1:
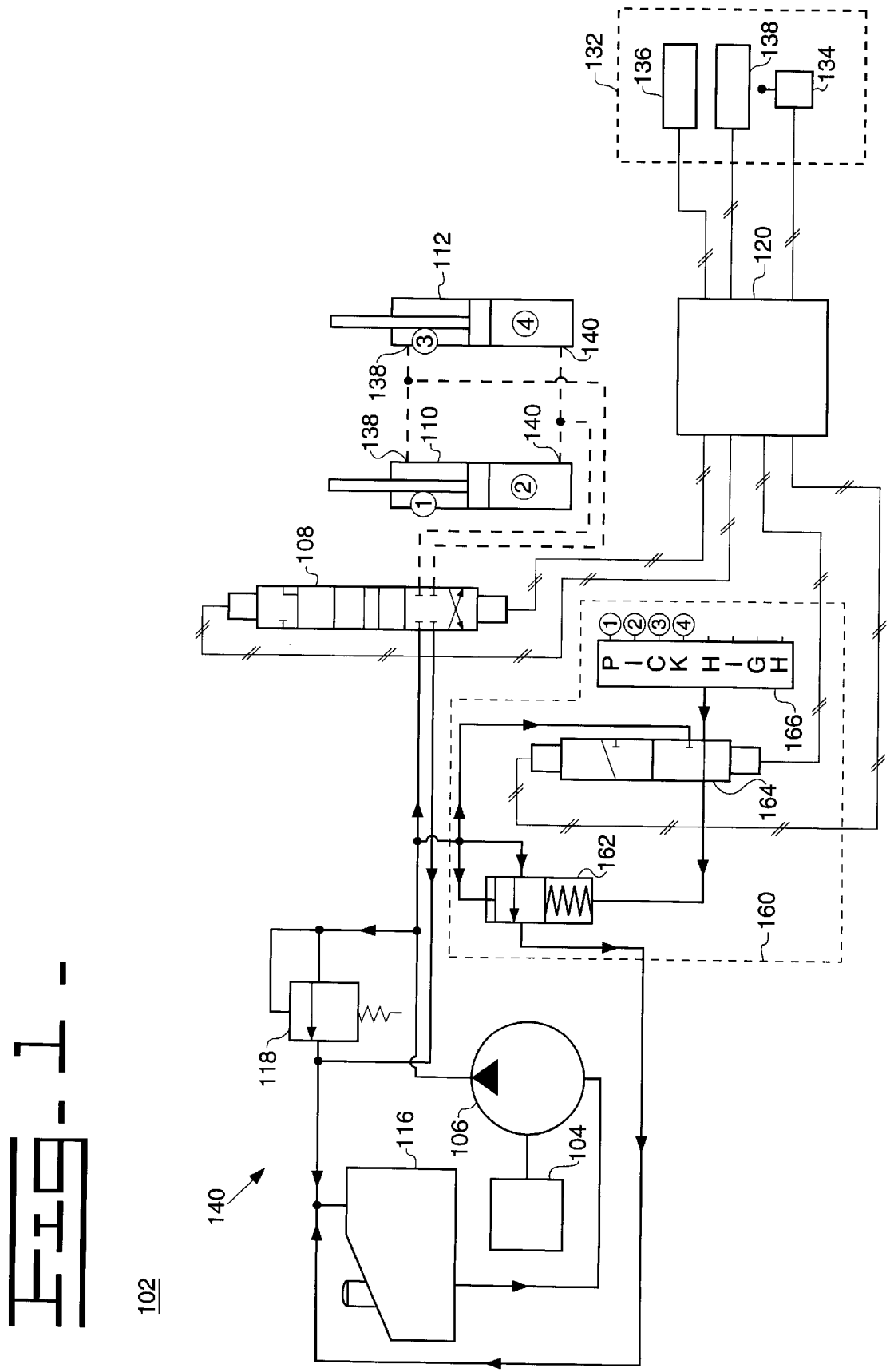
FIG. 1 is a high level diagram of one embodiment of an implement control system.
Figure 2:
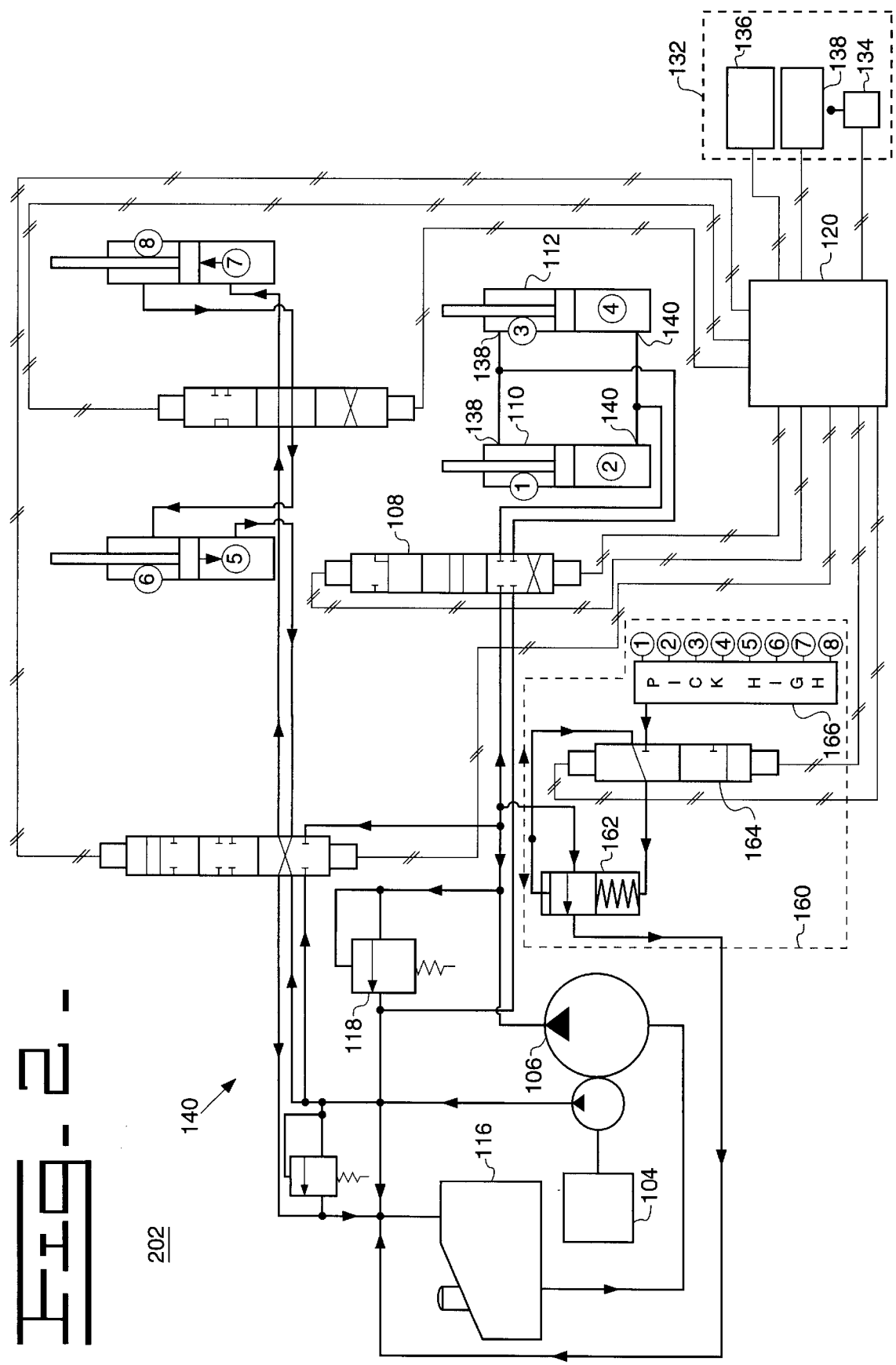
FIG. 2 is an alternative embodiment of an implement control system.

The present invention provides an apparatus and method for controlling a work implement in order to enable an earth moving machine to move to a service area when a failure occurs within the implement control system. FIG. 1 is an illustration of one embodiment of an implement control system 102. The implement control system 102 includes a hydraulic circuit 140. The hydraulic circuit 140 includes a pump engine 104 driving a pump 106. The pump 106 delivers actuating fluid to the circuit 140. In particular the pump 106 delivers fluid to a first and second fluid actuator 110, 112 via an actuator valve 108. In the preferred embodiment the first and second actuators 110, 112 are cylinders. Only two cylinders 110, 112 and one actuator valve 108 are illustrated in FIG. 1, however, additional cylinders and valves may be connected to the fluid system 102, as illustrated in FIG. 2. For example, in one embodiment, the implement control system 202 is located on a track type tractor having two work implements, a blade 308, and a ripper 306, as illustrated in FIG. 2, FIG. 3A, and FIG. 3B. In some machines, such as a track type tractor, multiple pumps may be used to deliver fluid to the work implements, such as the ripper 306 and the blade 308. Even though a track type tractor is illustrated, the present invention is equally applicable to other earth moving machine having a work implement, such as excavators, motor graders, cable shovels, wheel loaders etc.

Referring again to FIG. 1, the actuator valve 108 controls fluid flow to the actuators 110, 112. The fluid flows through the valve 108, and returns to a fluid sump 116, or tank. The tank 116 is also attached to the pump 106. The circuit 102 includes a relief valve 118 connected between the pump 106 and the tank 116. In addition, the system 102 may include a pressure compensation assembly 160 adapted to control the fluid pressure of the system 102 by bypassing fluid flow. In one embodiment, the pressure compensation assembly 160 includes a pressure compensation valve 162, a pressure compensation override (PCO) valve 164, and a resolver 136.

Referring again to FIG. 1, the circuit includes an operator interface 132. In the preferred embodiment the operator interface 132 includes at least one joystick 134, to control the work implement(s), a display 136 to convey information to an operator, and a keypad 138 to receive inputs from the operator. A touch screen display may be used instead of, or in conjunction with the keypad 138. In one embodiment, the operator interface 132 is located on the machine to interface with an on-board operator. In an alternative embodiment, the interface 132 may be located at a remote location to interface with a remote operator. In the preferred embodiment there is at least one joystick available to control each work implement.

The implement control system 102 includes an electronic control module (ECM) 120, as illustrated in FIG. 1. The ECM 120 is electrically connected to the actuator valve 108. The ECM 120 receives operator inputs, and inputs from sensors and responsively delivers command signals to the actuator valves 108, and the PCO valve 164 in order to control the position of the valves 108, 164 thereby controlling the amount of fluid that flows to the cylinders 110, 112. Therefore, the position of the cylinders 110, 112 may be controlled by the ECM 120. The operator inputs, or operator input signal, may be generated by an onboard operator (e.g., joystick inputs and keypad inputs), a remotely located operator, or an automated program. The sensor inputs received by the ECM 120 may include cylinder position signal(s), and fluid pressure signals. In response to the sensor inputs, a software program executing within the ECM 120 may be used to control the work implement(s) if a failure in the implement control system 102 occurs.

In the preferred embodiment the hydraulic circuit 102 is located on an earthmoving machine 302, such as a track type tractor, which is illustrated in FIG. 3A. The earthmoving machine 302 includes a work implement 308 controllably attached to at least one lift cylinder 110, and at least one angle cylinder 334. FIG. 3B illustrates a track type tractor 302 with a ripper attachment 306 connected to a first and second ripper cylinder 310.

FIG. 4 illustrates a flow diagram of one embodiment of the present invention. The method controls a work implement in order to enable an earth moving machine to move to an area where it may be serviced when a failure in the implement control system 102 occurs. In a first control block 402 a failure of a component within the implement control system 102 is detected. The failure may include a failure with a joystick being used for implement control, such as blade control. If the joystick fails, and the blade, for example, is engaging the ground, then the blade can not be controlled using the normal operator controls, i.e., the joystick. However, the blade needs to be placed in a limp home position, or desired travel position; in order to be to able travel to a service area. When a joystick failure is detected, the joystick is disabled to ensure that the faulty joystick does not cause an unintended movement. For example, in one embodiment, if the joystick begins delivering bad signal data to the controller 120, the controller 120 may ignore the joystick signal data, and generate a message for the operator indicating the joystick is not functioning properly. In addition, if a solenoid related failure occurs, such as a short to battery causing the solenoid to be consistently energized and therefore moving the implement to an undesirable position, the normal operator controls are not able to adequately control the blade placement in order to traverse the land site to get repaired. If a solenoid failure does occur, then, in one embodiment, all the solenoids in the circuit 102 are shut off. Then, as will be described below, only the solenoids that are needed for a particular function will be energized.

In a second control block 404 a limp home mode is enabled. The limp home mode is a mode entered when a failure has occurred to the implement control system effecting the control of the work implement. The mode is used to attempt to overcome the effects of the failure in order to place the implement in a position such that the machine may move to an area to be serviced. The mode may be enabled either by an on board or off board operator, or by an automated program. In the event an automated program is being used, the program is initiated by the detection of the work implement control system failure, e.g., the failure of the joystick. The operator may then be informed of the failure and prompted for an input regarding whether the operator desires to use the limp home mode.

In a third control block 406 the implement is controlled through operator interaction with the display 138 and the keypad 136. In the preferred embodiment, the operator is presented with the potential configuration of the machine. For example, if a blade and a ripper are attachable to the machine, then the operator will be presented with the ability to control either of these implements. That is, the operator will be presented with potential implement movements, via the display 138. For example, if a ripper and a blade are potential attachments for a machine, then the potential movements selectable would include: Blade Lift, Tilt, or Pitch, and Ripper Lift, or In/Out.

In an alternative embodiment, the implement configuration of the machine may be determined, e.g., a blade but no ripper attached, or a blade and a ripper currently attached. The operator may then be provided with the given movement options based on the available attached implement.

In the preferred embodiment, the operator may select a desired movement via the keypad. Alternatively, the operator may select an input using the display if the display is a touch screen display. The operator may then be presented with the potential options regarding the direction of the movement of the implement. The operator may then be prompted for a direction of motion. For example, the blade lift cylinder(s) may be moved to raise or lower the blade, whereas the blade tilt cylinder may be used to tilt the blade to the left or to the right. The operator is then prompted to select a control option. The operator for example may select raising the blade. The ECM 120 then delivers a command to the appropriate valve, to enable an incremental movement in the desired direction. In one embodiment, the incremental movement is enabled by providing an increased valve command for a short duration, e.g., 1 second, to the appropriate valve, thereby increasing the hydraulic pressure of the fluid being delivered to the cylinder. The time duration of the valve command is implementation dependent, and may vary depending on the desired implement motion. Specifically, the command is delivered to a solenoid 126 associated with the appropriate valve, thereby energizing the solenoid to control the valve to the appropriate position. By incrementally increasing the valve command the actuator is incrementally moved. After the command and subsequent movement of the cylinder and associated work implement, the potential implement movements are again displayed to the operator. The operator is prompted for an input, and the process is repeated. In this manner, the implement is only moved in a manner consistent with the operator's desires, thereby helping to avoid any potential errors that may occur due to the failures of the implement control system.

Commands of short duration are desirable so that, if there is a serious problem with the system, the work implement, and associated elements of the hydraulic circuit are not unnecessarily damaged. That is, the operator will be able to tell if there is a major problem after one or two commands of short duration and stop trying to move the implement, as opposed to a long implement command which could cause unnecessary damage if a major problem exists and the operator does not override the command in time. In addition, in some functions, such lowering the blade, short commands reduce the amount the blade is lowered at any given time. Therefore the blade will not be dropped from a high position, damaging the blade, when the blade is lowered, e.g., the controller may not accurately predict the height of the blade from the grade.

This process continues until each implement is placed in a position which will enable the machine to travel to an area where it may be serviced.

In an alternative embodiment, after a failure is detected, the functionality of the implement control system 102 is checked in light of the failure to determine if the failure will prevent a work implement from being re-positioned. In one embodiment, this may be done manually, or visually by the operator. In another embodiment, the controller may execute a diagnostic program to determine the status of the implement control system 102 and make a determination based on the diagnostic test as to whether limp home mode may be utilized. If the failure will prevent a work implement from being repositioned, the limp home mode is disabled and the operator is notified that the mode is not available due to the nature of the failure. If the failure will not prevent the work implement(s) from being repositioned, then control proceeds from the first decision block 402 to a the first control block 404, to enable the limp home mode.

In another alternative embodiment, the ECM 120 determines the current position of the implements, the desired travel position, or limp home position, of the implements, and then determines the appropriate, or recommended, cylinder movements needed to obtain the desired travel positions. In one embodiment, the operator is provided with the next recommended cylinder movement, e.g., raise the blade using the blade lift cylinder. The recommendation is presented to the operator via the display 132. The operator is then prompted for an input. If the operator accepts the recommended movement, via the keypad 138, then the cylinder is commanded to move for a short duration of time, enabling an incremental movement of the blade, as described above. If two cylinders are needed to perform the implement function, e.g., to raise the blade, then both cylinders are moved by commanding the associated valves to the proper position. The operator is then provided the next recommended cylinder movement via the display 132. If the operator rejects the recommended movement, they may override the command using the keypad 138, by providing a desired cylinder movement, as described earlier.

For example, if the blade is engaging the ground, a recommendation that the blade be raised would be displayed to the operator. The operator interface 132 would then be used to receive the operator input, and, if the recommendation is accepted, control the implement by initiating a short incremental movement by the work implement in the desired direction. A blade lift input command, for example, would result in the blade lift valve 108 being commanded to increase fluid pressure to the blade lift cylinder for a short duration of time, e.g., 1 second. Again, the duration of the command is implementation dependent. The implement is then held into position after the 1 second. The operator is then again provided with a recommendation of the appropriate implement command and then prompted for an input. The system then again provides additional fluid pressure to the lift cylinder for approximately one second. The short duration is utilized to ensure that if there is a problem with the components of the hydraulic circuit, such as the solenoid or valves, that an increase in fluid pressure for a short period of time will not adversely effect the system.

In an alternative embodiment, the operator is not prompted for each recommended implement position command. Once the operator has approved using the limp home mode, an automated program may attempt to place the implements in a limp home mode position. The program may determine the recommended commands needed to place the implements in the limp home mode position, then deliver the commands to the appropriate valves, via the ECM 120. The ECM delivers short, command burst to the appropriate valve to incrementally move the implement to the limp home position. An operator override option may be provided to ensure that the implement does not move to a position undesired by the operator, and also that if an additional problem develops, the operator may stop the implement movement.

Industrial Applicability

The present invention provides a method and apparatus for controlling a work implement in order to enable an earth moving machine to move to a service area after a failure within an implement control system occurs. The method includes the steps of detecting the failure of the implement control system, enabling a limp home mode in response to the failure, and controlling the implement into a limp home position through operator interaction using a display and either an associated keypad or a touch screen. In one embodiment of the present invention, when a failure occurs within the implement control system which will disable the normal operator controls of the implement, then a limp home mode is enabled. If the implement, such as the blade of a track type tractor may be moved, then a display is used to provide the operator with potential implement movements. The operator may manually, e.g., using a keypad, enter the desired implement movement, such as raise blade. An implement command of short duration is provided to the valve(s) corresponding to the appropriate cylinders. For example, to raise the blade, an command would be delivered to the valves that control the blade lift cylinder(s). The valve is commanded to a full open position for a short duration of time. Therefore, the blade is raised incrementally. After the blade has been repositioned with an incremental command, control is returned to the operator interface to enable the operator to determine the next desired blade command. In this manner the implement may be positioned by a series of short incremental commands.

The limp home mode may be utilized when the machine has reached the service area. For example, limp home mode may be used to lower the implement, e.g., blade, to the ground. Therefore, the implements may be placed in a lowered position while the machine is being serviced.

Other aspects, objects and advantages of the present invention can be obtained from a study of the drawings, the disclosure and the appended claims.

What is claimed is:

1. A method for controlling a work implement after a failure within an implement control system has occurred, comprising the steps of:
   detecting the failure of the implement control system;
   enabling a limp home mode in response to the failure;
   providing a potential implement command to an operator using a display;
   receiving an operator implement command through interaction with an operator input device; and
   controlling the implement into a limp home position in response to said operator implement command.

2. A method, as set forth in claim 1, wherein said failure includes an implement joystick failure.

3. A method, as set forth in claim 2, wherein said failure includes a solenoid failure.

4. A method, as set forth in claim 3, including the steps of:
   determining the detected failure will prevent implement movement; and
   disabling said limp home mode in response to said determination.

5. A method, as set forth in claim 4, including the step of determining a series of implement commands which will result in placing the implement in a limp home position.

6. A method, as set forth in claim 5, wherein each of said series of implement commands incrementally reposition the implement.

7. A method, as set forth in claim 6, wherein each said implement command is less than two seconds in duration.

8. A method, as set forth in claim 7, wherein each implement command energizes at least one valve to a full open position for a short predetermined time duration.

9. A method, as set forth in claim 8, wherein said work implement is a blade, and said limp home position is a raised position, and wherein moving a blade to a raised position includes a plurality of incremental raise blade commands being delivered to at least one valve associated with said blade, each said blade command causing the blade to raise an incremental amount.

10. A method, as set forth in claim 9, wherein said operator implement command is entered using said keypad.

11. An apparatus adapted to control a work implement after a failure within an implement control system has occurred, the apparatus including at least one cylinder connected to the work implement, comprising:

a means for detecting a failure within an implement control system and responsively generating a failure signal;

an operator interface adapted to receive an operator input and responsively generate an operator input signal, and receive and display an recommended implement command;

a controller adapted to receive said operator input signal, determine a failure has occurred within said implement control system, enable a limp home mode in response to said failure, generate said recommended implement command in response to said failure, and control said implement in response to said operator input signal.

12. An apparatus, as set forth in claim 11, wherein said operator interface includes:

an implement control joys tick; and at least one of a keypad and a display, or a touch screen display adapted to receive an operator input.

13. An apparatus, as set forth in claim 12, wherein said failure includes at least one of an implement joystick failure or a solenoid failure.

14. An apparatus, as set forth in claim 13, wherein said controller is further adapted to determine a sequence of implement commands configured to control the implement into a limp home position an implement command to an operator in response to said failure, recommend said implement command in response to said determined command sequence, receive said operator input command in response to said recommendation, and control the implement in response to said operator input command.

15. An apparatus, as set forth in claim 14, wherein said controller is further adapted to determine said failure will prevent implement movement, and disable said limp home mode in response to said determination.

16. An apparatus, as set forth in claim 15, wherein said controller is further adapted to determine a series of implement commands which will result in placing the implement in a limp home position.

17. An apparatus, as set forth in claim 16, wherein each of said series of implement commands incrementally reposition the implement.

18. An apparatus, as set forth in claim 17, wherein each said incremental implement command is generated for less than two seconds.

19. A method, as set forth in claim 1, wherein the step of controlling the implement into a limp home position further includes the steps of:

controlling the implement in response to said operator input command;

providing a second potential implement command to said operator;

receiving a second operator implement command; and controlling the implement in response to said second operator implement command.

20. A method, as set forth in claim 19, wherein the step of providing a potential implement command includes the steps of:

determining a sequence of implement commands configured to control the implement into a limp home position; and providing said potential implement command in response to said determined command sequence.

21. A method, as set forth in claim 19, wherein the step of providing a potential implement command includes the steps of:

determining at least one implement command configured to control the implement into a limp home position; and providing said potential implement command in response to said determined at least one implement command.

22. A method, as set forth in claim 1, wherein the step of controlling the implement into a limp home position further includes the steps of:

determining a sequence of implement commands configured to control the implement into a limp home position; and automatically controlling the implement into a limp home position in response to said operator input command and said determined sequence of commands.

23. A method, as set forth in claim 1, wherein said operator input device includes one of a key pad or a touch screen.

* * * * *

UNITED STATES PATENT AND TRADEMARK OFFICE
CERTIFICATE OF CORRECTION

PATENT NO. : 6,253,136 B1
DATED : June 26, 2001
INVENTOR(S) : Kenneth L. Stratton et al.

It is certified that error appears in the above-identified patent and that said Letters Patent is hereby corrected as shown below:

Column 2,
Line 34, delete "136" and insert -- 166 --

Column 6,
Line 37, delete "1" and insert -- 19 --
Line 39, delete "2" and insert -- 19 --
Line 41, delete "3" and insert -- 19 --

Column 7,
Line 19, delete "joys tick" and insert -- joystick --

Signed and Sealed this

Twenty-third Day of April, 2002

Attest:

JAMES E. ROGAN
Attesting Officer        Director of the United States Patent and Trademark Office